United States Patent
Cox et al.

(10) Patent No.: US 6,208,735 B1
(45) Date of Patent: Mar. 27, 2001

(54) SECURE SPREAD SPECTRUM WATERMARKING FOR MULTIMEDIA DATA

(75) Inventors: Ingemar J. Cox, Lawrenceville; Joseph J. Kilian, Princeton Junction; Talal G. Shamoon, Princeton, all of NJ (US)

(73) Assignee: NEC Research Institute, Inc., Princeton, NJ (US)

( * ) Notice: Subject to any disclaimer, the term of this patent is extended or adjusted under 35 U.S.C. 154(b) by 0 days.

(21) Appl. No.: 09/239,240

(22) Filed: Jan. 28, 1999

Related U.S. Application Data

(63) Continuation of application No. 08/926,720, filed on Sep. 10, 1997, now Pat. No. 5,930,369.

(51) Int. Cl.⁷ .................. G09C 5/00; H04L 9/00
(52) U.S. Cl. .................. 380/54; 283/113; 283/17; 283/73; 713/176; 380/55; 380/200; 380/202
(58) Field of Search .................. 380/54, 55, 200, 380/201, 202; 713/150, 168, 176; 283/17, 73, 113, 901; 341/51; 714/205; 382/212, 238; 707/101

(56) References Cited

U.S. PATENT DOCUMENTS

| | | |
|---|---|---|
| 4,707,077 | 11/1987 | Marom . |
| 4,939,515 | 7/1990 | Adelson . |
| 5,072,314 | 12/1991 | Chang . |
| 5,319,735 * | 6/1994 | Preuss et al. .................. 704/205 |
| 5,488,664 * | 1/1996 | Shamir .................. 380/54 |
| 5,530,751 * | 6/1996 | Morris .................. 380/202 |
| 5,530,759 * | 6/1996 | Braudaway et al. .................. 380/54 |
| 5,568,570 | 10/1996 | Rabbani . |
| 5,646,997 | 7/1997 | Barton . |
| 5,659,726 | 8/1997 | Sandford, II et al. . |
| 5,664,018 * | 9/1997 | Leighton .................. 380/54 |
| 5,734,752 * | 3/1998 | Knox .................. 382/212 |
| 5,809,139 | 9/1998 | Girod et al. . |
| 5,822,432 | 10/1998 | Moskowitz et al. . |
| 5,822,436 | 10/1998 | Rhoads . |
| 5,825,892 | 10/1998 | Braudaway et al. . |
| 5,841,978 | 11/1998 | Rhoads . |
| 5,850,481 | 12/1998 | Rhoads . |
| 5,859,920 | 1/1999 | Daly et al. . |
| 5,862,260 | 1/1999 | Rhoads . |
| 5,900,608 | 5/1999 | Iida . |
| 5,901,224 | 5/1999 | Hecht . |
| 5,905,505 | 5/1999 | Lesk . |
| 5,905,800 | 5/1999 | Moskowitz et al. . |
| 5,905,819 | 5/1999 | Daly . |
| 5,930,369 * | 7/1999 | Cox et al. .................. 380/54 |

FOREIGN PATENT DOCUMENTS

| | | | |
|---|---|---|---|
| 0 651 554 A1 | 10/1994 | (EP) | .................. H04N/1/21 |

OTHER PUBLICATIONS

Macq et al., "Cryptology for Digital TV Broadcasting", in Proceedings of the IEEE, 83 (1995) Jun., No. 6, New York, US., pp. 944–957.

Zhao et al., "Embedding Robust Labels into Images for Copyright Protection", pp. 242–247, No Date.

* cited by examiner

Primary Examiner—Bernarr E. Gregory
(74) Attorney, Agent, or Firm—Philip J. Feig

(57) ABSTRACT

Digital watermarking of audio, image, video or multimedia data is achieved by inserting the watermark into the perceptually significant components of a decomposition of the data in a manner so as to be visually imperceptible. In a preferred method, a frequency spectral image of the data, preferably a Fourier transform of the data, is obtained. A watermark is inserted into perceptually significant components of the frequency spectral image. The resultant watermarked spectral image is subjected to an inverse transform to produce watermarked data. The watermark is extracted from watermarked data by first comparing the watermarked data with the original data to obtain an extracted watermark. Then, the original watermark, original data and the extracted watermark are compared to generate a watermark which is analyzed for authenticity of the watermark.

10 Claims, 6 Drawing Sheets

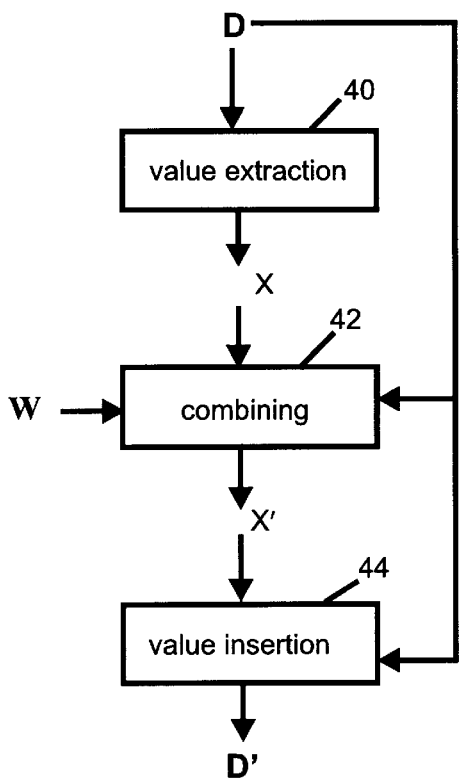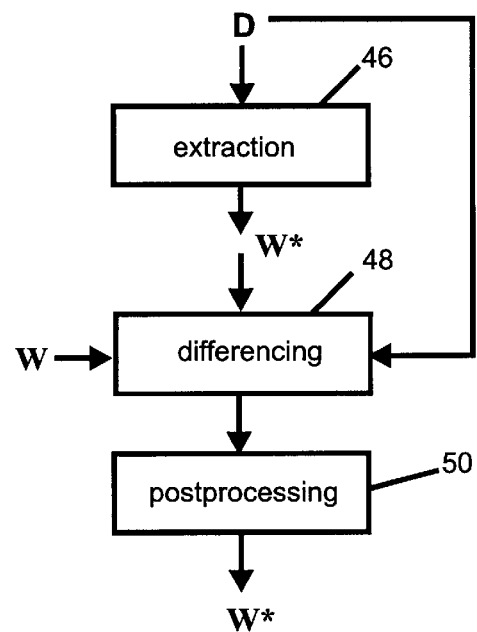
FIGURE 3a                    FIGURE 3b

SECURE SPREAD SPECTRUM WATERMARKING FOR MULTIMEDIA DATA

This is a continuation of application Ser. No. 08/926,720, filed Sep. 10, 1997, now U.S. Pat. No. 5,930,369, which is a continuation of application Ser. No. 08/534,894, filed Sep. 28, 1995 (became an FWC).

FIELD OF THE INVENTION

The present invention concerns a method of digital watermarking for use in audio, image, video and multimedia data for the purpose of authenticating copyright ownership, identifying copyright infringers or transmitting a hidden message. Specifically, a watermark is inserted into the perceptually most significant components of a decomposition of the data in a manner so as to be virtually imperceptible. More specifically, a narrow band signal representing the watermark is placed in a wideband channel that is the data.

BACKGROUND OF THE INVENTION

The proliferation of digitized media such as audio, image and video is creating a need for a security system which facilitates the identification of the source of the material. The need manifests itself in terms of copyright enforcement and identification of the source of the material.

Using conventional cryptographic systems permits only valid keyholder access to encrypted data, but once the data is encrypted, it is not possible to maintain records of its subsequent representation or transmission. Conventional cryptography therefore provides minimal protection against data piracy of the type a publisher or owner of data or material is confronted with by unauthorized reproduction or distribution of such data or material.

A digital watermark is intended to complement cryptographic processes. The watermark is a visible or preferably an invisible identification code that is permanently embedded in the data. That is, the watermark remains with the data after any decryption process. As used herein the terms data and material will be understood to refer to audio (speech and music), images (photographs and graphics), video (movies or sequences of images) and multimedia data (combinations of the above categories of materials) or processed or compressed versions thereof. These terms are not intended to refer to ASCII representations of text, but do refer to text represented as an image. A simple example of a watermark is a visible "seal" placed over an image to identify the copyright owner. However, the watermark might also contain additional information, including the identity of the purchaser of the particular copy of the image. An effective watermark should possess the following properties:

1. The watermark should be perceptually invisible or its presence should not interfere with the material being protected.
2. The watermark must be difficult (preferably virtually impossible) to remove from the material without rendering the material useless for its intended purpose. However, if only partial knowledge is known, e.g. the exact location of the watermark within an image is unknown, then attempts to remove or destroy the watermark, for instance by adding noise, should result in severe degradation in data fidelity, rendering the data useless, before the watermark is removed or lost.
3. The watermark should be robust against collusion by multiple individuals who each possess a watermarked copy of the data. That is, the watermark should be robust to the combining of copies of the same data set to destroy the watermarks. Also, it must not be possible for colluders to combine each of their images to generate a different valid watermark.
4. The watermark should still be retrievable if common signal processing operations are applied to the data. These operations include, but are not limited to digital-to-analog and analog-to-digital conversion, resampling, requantization (including dithering and recompression) and common signal enhancements to image contrast and color, or audio bass and treble for example. The watermarks in image and video data should be immune from geometric image operations such as rotation, translation, cropping and scaling.
5. The same digital watermark method or algorithm should be applicable to each of the different media under consideration. This is particularly useful in watermarking of multimedia material. Moreover, this feature is conducive to the implementation of video and image/video watermarking using common hardware.
6. Retrieval of the watermark should unambiguously identify the owner. Moreover, the accuracy of the owner identification should degrade gracefully during attack.

Several previous digital watermarking methods have been proposed. L. F. Turner in W.I.P.U. patent publication number WO89/08915 entitled "Digital Data Security System" proposed a method for inserting an identification string into a digital audio signal by substituting the "insignificant" bits of randomly selected audio samples with the bits of an identification code. Bits are deemed "insignificant" if their alteration is inaudible. Such a system is also appropriate for two dimensional data such as images, as discussed in an article by R. G. Van Schyndel et al entitled "A digital watermark" in Intl. Conf. on Image Processing, vol 2, Pages 86–90, 1994. The Turner method may easily be circumvented. For example, if it is known that the algorithm only affects the least significant two bits of a word, then it is possible to randomly flip all such bits, thereby destroying any existing identification code.

An article entitled "Assuring Ownership Rights for Digital Images" by G. Caronni, in Proc. Reliable IT Systems, VIS '95, 1995 suggests adding tags—small geometric patterns-to-digitized images at brightness levels that are imperceptible. While the idea of hiding a spatial watermark in an image is fundamentally sound, this scheme is susceptible to attack by filtering and redigitization. The fainter such watermarks are, the more susceptible they are to such attacks and geometric shapes provide only a limited alphabet with which to encode information. Moreover, the scheme is not applicable to audio data and may not be robust to common geometric distortions, especially cropping.

J. Brassil et al in an article entitled "Electronic Marking and Identification Techniques to Discourage Document Copying" in Proc. of Infocom 94, pp 1278–1287, 1994 propose three methods appropriate for document images in which text is common. Digital watermarks are coded by: (1) vertically shifting text lines, (2) horizontally shifting words, or (3) altering text features such as the vertical endlines of individual characters. Unfortunately, all three proposals are easily defeated, as discussed by the authors. Moreover, these techniques are restricted exclusively to images containing text.

An article by K. Tanaka et al entitled "Embedding Secret Information into a Dithered Multi-level Image" in IEEE Military Comm. Conf., pp216–220, 1990 and K. Mitsui et al in an article entitled "Video-Steganography" in IMA Intellectual Property Proc., vI, pp187–206, 1994, describe several watermarking schemes that rely on embedding watermarks that resemble quantization noise. Their ideas hinge on the notion that quantization noise is typically imperceptible to viewers. Their first scheme injects a watermark into an image by using a predetermined data stream to guide level selection in a predictive quantizer. The data stream is chosen so that the resulting watermark looks like quantization noise. A variation of this scheme is also presented, where a watermark in the form of a dithering matrix is used to dither an image in a certain way. There are several drawbacks to these schemes. The most important is that they are susceptible to signal processing, especially requantization, and geometric attacks such as cropping. Furthermore, they degrade an image in the same way that predictive coding and dithering can.

In Tanaka et al, the authors also propose a scheme for watermarking facsimile data. This scheme shortens or lengthens certain runs of data in the run length code used to generate the coded fax image. This proposal is susceptible to digital-to-analog and analog-to-digital conversions. In particular, randomizing the least significant bit (LSB) of each pixel's intensity will completely alter the resulting run length encoding. Tanaka et al also propose a watermarking method for "color-scaled picture and video sequences". This method applies the same signal transform as JPEG (DCT of 8×8 sub-blocks of an image) and embeds a watermark in the coefficient quantization module. While being compatible with existing transform coders, this scheme is quite susceptible to requantization and filtering and is equivalent to coding the watermark in the least significant bits of the transform coefficients.

In a recent paper, by Macq and Quisquater entitled "Cryptology for Digital TV Broadcasting" in Proc. of the IEEE, 83(6), pp944–957, 1995 there is briefly discussed the issue of watermarking digital images as part of a general survey on cryptography and digital television. The authors provide a description of a procedure to insert a watermark into the least significant bits of pixels located in the vicinity of image contours. Since it relies on modifications of the least significant bits, the watermark is easily destroyed. Further, the method is only applicable to images in that it seeks to insert the watermark into image regions that lie on the edge of contours.

W. Bender et al in article entitled "Techniques for Data Hiding" in Proc. of SPIE, v2420, page 40, July 1995, describe two watermarking schemes. The first is a statistical method called "Patchwork". Patchwork randomly chooses n pairs of image points $(a_i, b_i)$ and increases the brightness at $a_i$ by one unit while correspondingly decreasing the brightness of $b_i$. The expected value of the sum of the differences of the n pairs of points is claimed to be 2n, provided certain statistical properties of the image are true. In particular, it is assumed that all brightness levels are equally likely, that is, intensities are uniformly distributed. However, in practice, this is very uncommon. Moreover, the scheme may not be robust to randomly jittering the intensity levels by a single unit, and be extremely sensitive to geometric affine transformations.

The second method is called "texture block coding", where a region of random texture pattern found in the image is copied to an area of the image with similar texture. Autocorrelation is then used to recover each texture region. The most significant problem with this technique is that it is only appropriate for images that possess large areas of random texture. The technique could not be used on images of text, for example. Nor is there a direct analog for audio.

In addition to direct work on watermarking images, there are several works of interest in related areas. E. H. Adelson in U.S. Pat. No. 4,939,515 entitled "Digital Signal Encoding and Decoding Apparatus" describes a technique for embedding digital information in an analog signal for the purpose of inserting digital data into an analog TV signal. The analog signal is quantized into one of two disjoint ranges ({0,2,4 . . . }, {1,3,5}, for example) which are selected based on the binary digit to be transmitted. Thus Adelson's method is equivalent to watermark schemes that encode information into the least significant bits of the data or its transform coefficients. Adelson recognizes that the method is susceptible to noise and therefore proposes an alternative scheme wherein a 2×1 Hadamard transform of the digitized analog signal is taken. The differential coefficient of the Hadamard transform is offset by 0 or 1 unit prior to computing the inverse transform. This corresponds to encoding the watermark into the least significant bit of the differential coefficient of the Hadamard transform. It is not clear that this approach would demonstrate enhanced resilience to noise. Furthermore, like all such least significant bit schemes, an attacker can eliminate the watermark by randomization.

U.S. Pat. No. 5,010,405 describes a method of interleaving a standard NTSC signal within an enhanced definition television (EDTV) signal. This is accomplished by analyzing the frequency spectrum of the EDTV signal (larger than that of the NTSC signal) and decomposing it into three sub-bands (L,M,H for low, medium and high frequency respectively). In contrast, the NTSC signal is decomposed into two subbands, L and M. The coefficients, $M_k$, within the M band are quantized into M levels and the high frequency coefficients, $H_k$, of the EDTV signal are scaled such that the addition of the $H_k$ signal plus any noise present in the system is less than the minimum separation between quantization levels. Once more, the method relies on modifying least significant bits. Presumably, the mid-range rather than low frequencies were chosen because they are less perceptually significant. In contrast, the method proposed in the present invention modifies the most perceptually significant components of the signal.

Finally, it should be noted that many, if not all, of the prior art protocols are not collusion resistant.

Recently, Digimarc Corporation of Portland, Oregon, has described work referred to as signature technology for use in identifying digital intellectual property. Their method adds or subtracts small random quantities from each pixels. Addition or subtraction is based on comparing a binary mask of N bits with the least significant bit (LSB) of each pixel. If the LSB is equal to the corresponding mask bit, then the random quantity is added, otherwise it is subtracted. The watermark is extracted by first computing the difference between the original and watermarked images and then by examining the sign of the difference, pixel by pixel, to determine if it corresponds to the original sequence of additions/subtractions. The Digimarc technique is not based on direct modifications of the image spectrum and does not make use of perceptual relevance. While the technique appears to be robust, it may be susceptible to constant brightness offsets and to attacks based on exploiting the high degree of local correlation present in an image. For example, randomly switching the position of similar pixels within a local neighborhood may significantly degrade the watermark without damaging the image.

In a paper by Koch, Rindfrey and Zhao entitled "Copyright Protection for Multimedia Data", two general methods for watermarking images are described. The first method partitions an image into 8×8 blocks of pixels and computes the Discrete Cosine Transform (DCT) of each of these blocks. A pseudorandom subset of the blocks is chosen and in each such block a triple of frequencies selected from one of 18 predetermined triples is modified so that their relative strengths encode a 1 or 0 value. The 18 possible triples are composed by selection of three out of eight predetermined frequencies within the 8×8 DCT block. The choice of the eight frequencies to be altered within the DCT block appears to be based on the belief that middle frequencies have a moderate variance level, i.e., they have similar magnitude. This property is needed in order to allow the relative strength of the frequency triples to be altered without requiring a modification that would be perceptually noticeable. Unlike in the present invention, the set of frequencies is not chosen based on any perceptual significance or relative energy considerations. In addition, because the variance between the eight frequency coefficients is small, one would expect that the technique may be sensitive to noise or distortions. This is supported by the experimental results reported in the Koch et al paper, supra, where it is reported that the "embedded labels are robust against JPEG compression for a quality factor as low as about 50%". In contrast, the method described in accordance with the teachings of the present invention has been demonstrated with compression quality factors as low as 5 percent.

An earlier proposal by Koch and Zhao in a paper entitled "Toward Robust and Hidden Image Copyright Labeling" proposed not triples of frequencies but pairs of frequencies and was again designed specifically for robustness to JPEG compression. Nevertheless, the report states that "a lower quality factor will increase the likelihood that the changes necessary to superimpose the embedded code on the signal will be noticeably visible".

In a second method, proposed by Koch and Zhao, designed for black and white images, no frequency transform is employed. Instead, the selected blocks are modified so that the relative frequency of white and black pixels encodes the final value. Both watermarking procedures are particularly vulnerable to multiple document attacks. To protect against this, Zhao and Koch proposed a distributed 8×8 block of pixels created by randomly sampling 64 pixels from the image. However, the resulting DCT has no relationship to that of the true image. Consequently, one would expect such distributed blocks to be both sensitive to noise and likely to cause noticeable artifacts in the image.

In summary, prior art digital watermarking techniques are not robust and the watermark is easy to remove. In addition, many prior techniques would not survive common signal and geometric distortions

SUMMARY OF THE INVENTION

The present invention overcomes the limitations of the prior art methods by providing a watermarking system that embeds an unique identifier into the perceptually significant components of a decomposition of an image, an audio signal or a video sequence.

Preferably, the decomposition is a spectral frequency decomposition. The watermark is embedded in the data's perceptually significant frequency components. This is because an effective watermark cannot be located in perceptually insignificant regions of image data or in its frequency spectrum, since many common signal or geometric processes affect these components. For example, a watermark located in the high frequency spectral components of an image is easily removed, with minor degradation to the image, by a process that performs low pass filtering. The issue then becomes one of how to insert the watermark into the most significant regions of the data frequency spectrum without the alteration being noticeable to an observer, i.e., a human or a machine feature recognition system. Any spectral component may be altered, provided the alteration is small. However, very small alterations are susceptible to any noise present or intentional distortion.

In order to overcome this problem, the frequency domain of the image data or sound data may be considered as a communication channel, and correspondingly the watermark may be considered as a signal transmitted through the channel. Attacks and intentional signal distortions are thus treated as noise from which the transmitted signal must be immune. Attacks are intentional efforts to remove, delete or otherwise overcome the beneficial aspects of the data watermarking. While the present invention is intended to embed watermarks in data, the same methodology can be applied to sending any type of message through media data.

Instead of encoding the watermark into the least significant components of the data, the present invention considers applying concepts of spread spectrum communication. In spread spectrum communications, a narrowband signal is transmitted over a much larger bandwidth such that the signal energy present in any single frequency is imperceptible. In a similar manner, the watermark is spread over many frequency bins so that the energy in any single bin is small and imperceptible. Since the watermark verification process includes a priori knowledge of the locations and content of the watermarks, it is possible to concentrate these many weak signals into a single signal with a high signal to-noise ratio. Destruction of such a watermark would require noise of high amplitude to be added to every frequency bin.

In accordance with the teachings of the present invention, a watermark is inserted into the perceptually most significant regions of the data decomposition. The watermark itself is designed to appear to be additive random noise and is spread throughout the image. By placing the watermark into the perceptually significant components, it is much more difficult for an attacker to add more noise to the components without adversely affecting the image or other data. It is the fact that the watermark looks like noise and is spread throughout the image or data which makes the present scheme appear to be similar to spread spectrum methods used in communications system.

Spreading the watermark throughout the spectrum of an image ensures a large measure of security against unintentional or intentional attack. First, the location of the watermark is not obvious. Second, frequency regions are selected in a fashion that ensures severe degradation of the original data following any attack on the watermark.

A watermark that is well placed in the frequency domain of an image or a sound track will be practically impossible to see or hear. This will always be the case if the energy in the watermark is sufficiently small in any single frequency coefficient Moreover, it is possible to increase the energy present in particular frequencies by exploiting knowledge of masking phenomena in the human auditory and visual systems. Perceptual masking refers to any situation where information in certain regions of an image or a sound is occluded by perceptually more prominent information in another part of the image or sound. In digital waveform coding, this frequency domain (and in some cases, time/ pixel domain) masking is exploited extensively to achieve low bit rate encoding of data. It is clear that both auditory and visual systems attach more resolution to the high energy, low frequency, spectral regions of an auditory or visual scene. Further, spectrum analysis of images and sounds reveals that most of the information in such data is often located in the low frequency regions.

In addition, particularly for processed or compressed data, perceptually significant need not refer to human perceptual significance, but may refer instead to machine perceptual significance, for instance, machine feature recognition.

To meet these requirements, a watermark is proposed whose structure comprises a large quantity, for instance 1000, of randomly generated numbers with a normal distribution having zero mean and unity variance. A binary watermark is not chosen because it is much less robust to attacks based on collusion of several independently watermarked copies of an image. However, generally, the watermark might have arbitrary structure, both deterministic and/or random, and including uniform distributions. The length of the proposed watermark is variable and can be adjusted to suit the characteristics of the data. For example, longer watermarks might be used for images that are especially sensitive to large modifications of its spectral coefficients, thus requiring weaker scaling factors for individual components.

The watermark is then placed in components of the image spectrum. These components may be chosen based on an analysis of those components which are most vulnerable to attack and/or which are most perceptually significant. This ensures that the watermark remains with the image even after common signal and geometric distortions. Modification of these spectral components results in severe image degradation long before the watermark itself is destroyed. Of course, to insert the watermark, it is necessary to alter these very same coefficients. However, each modification can be extremely small and, in a manner similar to spread spectrum communication, a strong narrowband watermark may be distributed over a much broader image (channel) spectrum. Conceptually, detection of the watermark then proceeds by adding all of these very small signals, whose locations are only known to the copyright owner, and concentrating the watermark into a signal with high signal-to-noise ratio. Because the location of the watermark is only known to the copyright holder, an attacker would have to add very much more noise energy to each spectral coefficient in order to be confident of removing the watermark. However, this process would destroy the image.

Preferably, a predetermined number of the largest coefficients of the DCT (discrete cosine transform) (excluding the DC term) are used. However, the choice of the DCT is not critical to the algorithm and other spectral transforms, including wavelet type decompositions are also possible. In fact, use of the FFT rather than DCT is preferable from a computational perspective.

The invention will be more clearly understood when the following description is read in conjunction with the accompanying drawing.

BRIEF DESCRIPTION OF THE DRAWING

FIGS. 3a and 3b are flow charts of the encoding and decoding of watermarks;

DETAILED DESCRIPTION

Figure 1:
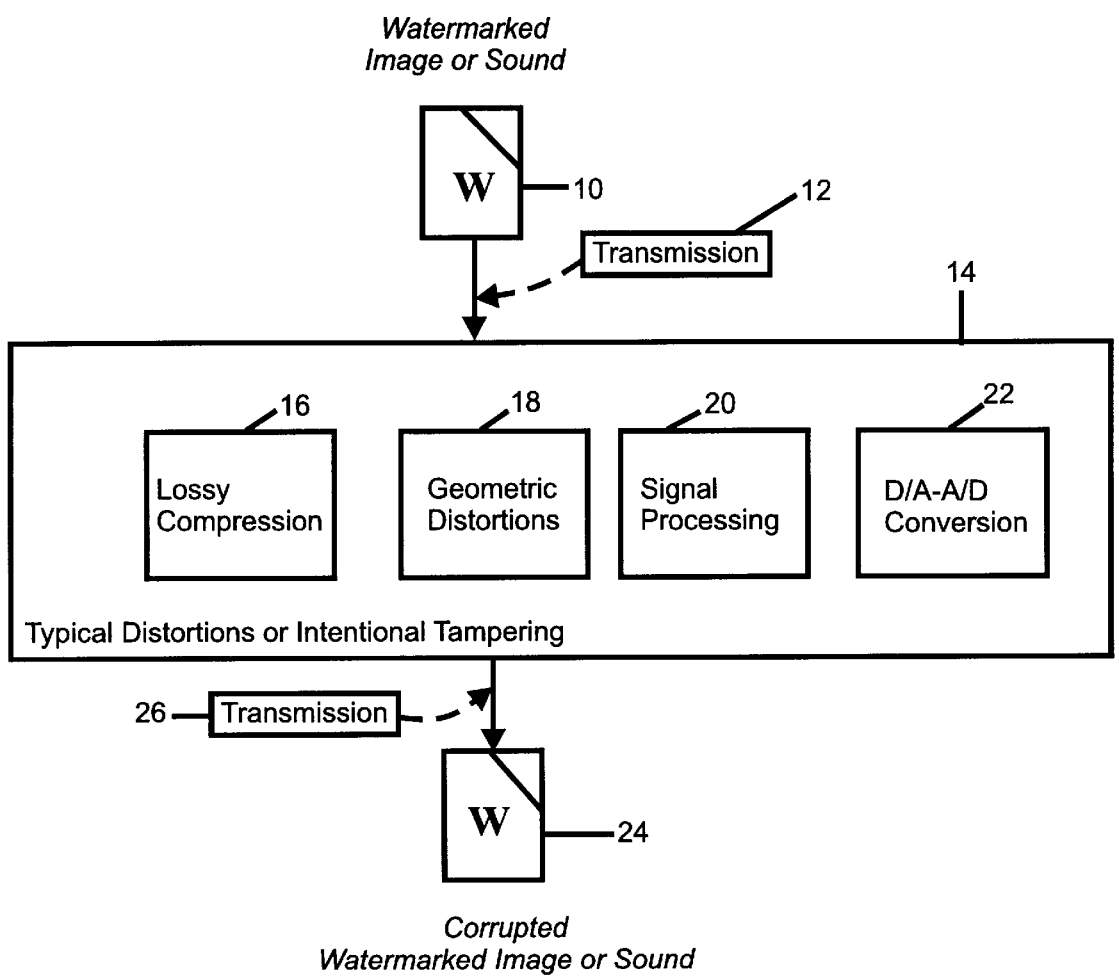
FIG. 1 is a schematic representation of typical common processing operations to which data could be subjected.

In order to better understand the advantages of the invention, the preferred embodiment of a frequency spectrum based watermarking system will be described. It is instructive to examine the processing stages that image (or sound) data may undergo in the copying process and to consider the effect that such processing stages can have on the data. Referring to FIG. 1, a watermarked image or sound data 10 is transmitted 12 to undergo typical distortion or intentional tampering 14. Such distortions or tampering includes lossy compression 16, geometric distortion 18, signal processing 20 and D/A and A/D conversion 22. After undergoing distortion or tampering, corrupted watermarked image or sound data 24 is transmitted 26. The process of "transmission" refers to the application of any source or channel code and/or of encryption techniques to the data. While most transmission steps are information lossless, many compression schemes (e.g., JPEG, MPEG, etc.) may potentially degrade the quality of the data through irretrievable loss of data. In general, a watermarking method should be resilient to any distortions introduced by transmission or compression algorithms.

Lossy compression 16 is an operation that usually eliminates perceptually irrelevant components of image or sound data. In order to preserve a watermark when undergoing lossy compression, the watermark is located in a perceptually significant region of the data. Most processing of this type occurs in the frequency domain. Data loss usually occurs in the high frequency components. Thus, the watermark must be placed in the significant frequency component of the image (or sound) data spectrum to minimize the adverse affects of lossy compression.

After receipt, an image may encounter many common transformations that are broadly categorized as geometric distortions or signal distortions. Geometric distortions 18 are specific to image and video data, and include such operations as rotation, translation, scaling and cropping. By manually determining a minimum of four or nine corresponding points between the original and the distorted watermark, it is possible to remove any two or three dimensional affine transformation. However, an affine scaling (shrinking) of the image results in a loss of data in the high frequency spectral regions of the image. Cropping, or the cutting out and removal of portions of an image, also results in irretrievable loss of data. Cropping may be a serious threat to any spatially based watermark but is less likely to affect a frequency-based scheme.

Common signal distortions include digital-to-analog and analog-to-digital conversion 22, resampling, requantization, including dithering and recompression, and common signal enhancements to image contrast and/or color, and audio frequency equalization. Many of these distortions are non-linear, and it is difficult to analyze their effect in either a spatial or frequency based method. However, the fact that the original image is known allows many signal transformations to be undone, at least approximately. For example, histogram equalization, a common non-linear contrast enhancement method, may be substantially removed by histogram specification or dynamic histogram warping techniques.

Finally, the copied image may not remain in digital form. Instead, it is likely to be printed or an analog recording made (analog audio or video tape). These reproductions introduce additional degradation into the image data that a watermarking scheme must be robust to.

Tampering (or attack) refers to any intentional attempt to remove the watermark, or corrupt it beyond recognition. The watermark must not only be resistant to the inadvertent application of distortions. It must also be immune to intentional manipulation by malicious parties. These manipulations can include combinations of distortions, and can also include collusion and forgery attacks.

Figure 2:
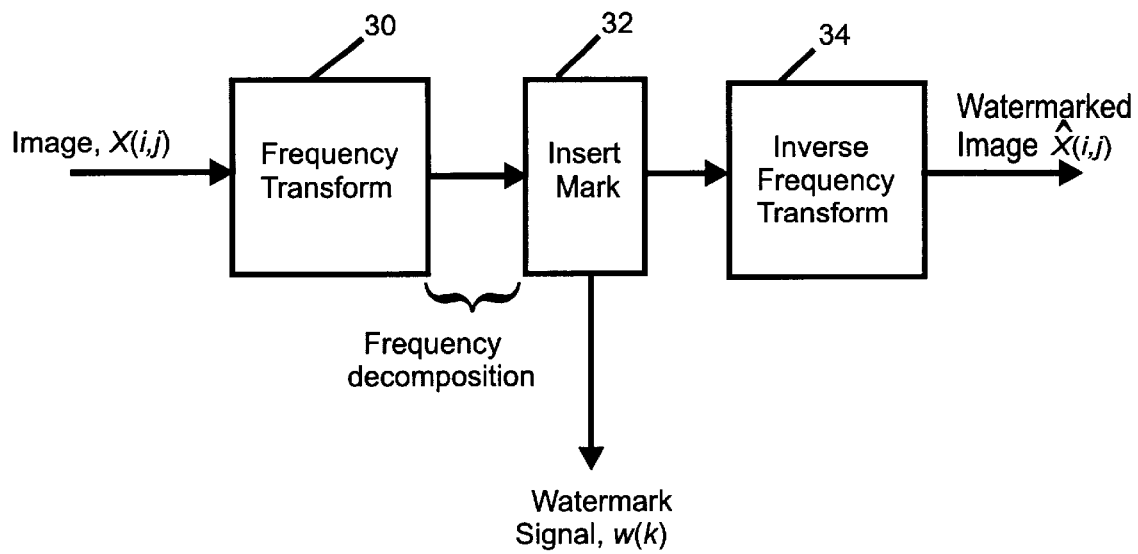
FIG. 2 is a schematic representation of a preferred system for immersing a watermark into an image.

FIG. 2 shows a preferred system for inserting a watermark into an image in the frequency domain. Image data $X(i,j)$ assumed to be in digital form, or alternatively data in other formats such as photographs, paintings or the like, that have been previously digitized by well-known methods, is subject to a frequency transformation 30, such as the Fourier transform. A watermark signal W (k) is inserted into the frequency spectrum components of the transformed image data 32 applying the techniques described below. The frequency spectrum image data including the watermark signal is subjected to an inverse frequency transform 34, resulting in watermarked image data $\hat{R}(i, j)$, which may remain in digital form or be printed as an analog representation by well-known methods.

After applying a frequency transformation to the image data 30, a perceptual mask is computed that highlights prominent regions in the frequency spectrum capable of supporting the watermark without overly affecting perceptual fidelity. This may be performed by using knowledge of the perceptual significance of each frequency in the spectrum, as discussed earlier, or simply by ranking the frequencies based on their energy. The latter method was used in experiments described below.

In general, it is desired to place the watermark in regions of the spectrum that are least affected by common signal distortions and are most significant to image quality as perceived by a viewer, such that significant modification would destroy the image fidelity. In practice, these regions could be experimentally identified by applying common signal distortions to images and examining which frequencies are most affected, and by psychophysical studies to identify how much each component may be modified before significant changes in the image are perceivable.

The watermark signal is then inserted into these prominent regions in a way that makes any tampering create visible (or audible) defects in the data. The requirements of the watermark mentioned above and the distortions common to copying provide constraints on the design of an electronic watermark.

In order to better understand the watermarking method, reference is made to FIGS. 3(a) and 3(b) where from each document D a sequence of values $X=x_1, \ldots, x_n$ is extracted 40 with which a watermark $W=w_1, \ldots, w_n$ is combined 42 to create an adjusted sequence of values $X'=x'_1, \ldots, x'_n$ which is then inserted back 44 into the document in place of values X in order to obtain a watermark document D'. An attack of the document D', or other distortion, will produce a document D*. Having the original document D and the document D*, a possibly corrupted watermark W* is extracted 46 and compared to watermark W 48 for statistical analysis 50. The values W* are extracted by first extracting a set of values $X^*=x_1^*, \ldots, x_n^*$ from D* (using information about D) and then generating W* from the values X* and the values X.

When combining the values X with the watermark values W in step 42, scaling parameter ax is specified. The scaling parameter a determines the extent to which values W alter values X. Three preferred formulas for computing X' are:

$$x_i' = x_i + \alpha w_i \quad (1)$$

$$x_i' = x_i(1+\alpha w_i) \quad (2)$$

$$x_i' = x_i(e^{\alpha w_i}) \quad (3)$$

Equation 1 is invertible. Equations 2 and 3 are invertible when $x_i \neq 0$. Therefore, given X* it is possible to compute the inverse function necessary to derive W* from X and X*.

Equation 1 is not the preferred formula when the values $x_i$ vary over a wide range. For example, if $x_i=10^6$ then adding 100 may be insufficient to establish a watermark, but if $x_i=10$, then adding 100 will unacceptably distort the value. Insertion methods using equations 2 and 3 are more robust when encountering such a wide range of values $x_i$. It will also be observed that equation 2 and 3 yield similar results when $\alpha w_i$ is small. Moreover, when $x_i$ is positive, equation 3 is equivalent to $\ln(x_i')=\ln(x_i)+\alpha x_i$ and may be considered as an application of equation 1 when natural logarithms of the original values are used. For example, if $|w_i| \leq 1$ and $\alpha=0.01$, then using Equation (2) guarantees that the spectral coefficient will change by no more than 1%.

For certain applications, a single scaling parameter a may not be best for combining all values of $x_i$. Therefore, multiple scaling parameters $\alpha_i, \ldots, \alpha_n$ can be used with revised equations 1 to 3 such as $x_i'=x_i(1+\alpha_i w_i)$. The values of $\alpha_i$ serve as a relative measure of how much $x_i$ must be altered to change the perceptual quality of the document. A large value for $\alpha_i$ means that it is possible to alter $x_i$ by a large amount without perceptually degrading the document.

A method for selecting the multiple scaling values is based upon certain general assumptions. For example, equation 2 is a special case of the generalized equation 1, $(x_i'=x_i+\alpha_i x_i)$, for $\alpha_i=\alpha x_i$. That is, equation 2 makes the reasonable assumption that a large value of $x_i$ is less sensitive to additive alteration that a small value of $x_i$.

Generally, the sensitivity of the image to different values of $\alpha_i$ is unknown. A method of empirically estimating the sensitivities is to determine the distortion caused by a number of attacks on the original image. For example, it is possible to compute a degraded image D* from D, extract the corresponding values $x_1^*, \ldots, x_n^*$ and select $\alpha_i$ to be proportional to the deviation $|x_i^*-x_i|$. For greater robustness, it is possible to try other forms of distortion and make $\alpha_i$ proportional to the average value of $|x_i^*-x_i|$. Instead of using the average distortion, it is possible to use the median or maximum deviation.

Alternatively, it is possible to combine the empirical approach with general global assumptions regarding the sensitivity of the values. For example, it might be required that $\alpha_i \geq \alpha_j$ whenever $x_i \geq x_j$. This can be combined with the empirical approach by setting $\alpha_i$ according to $$\alpha_i \sim \max_{\{j | v_j \leq v_i\}} |v_j^* - v_j|$$

A more sophisticated approach is to weaken the monotonicity constraint to be robust against occasional outliers.

The length of the watermark, n, determines the degree to which the watermark is spread among the relevant components of the image data. As the size of the watermark increases, so does the number of altered spectral components, and the extent to which each component need be altered decreases for the same resilience to noise. Consider watermarks of the form $x_i'=x_i+\alpha w_i$ and a white noise attack by $x_i'=x_i'+r_i$, where $r_i$ are chosen according to independent normal distributions with standard deviation σ. It is possible to recover the watermark when a is proportional to σ/√n. That is, quadrupling the number of components can halve the magnitude of the watermark placed into each component. The sum of the squares of the deviations remains essentially unchanged.

In general, a watermark comprises an arbitrary sequence of real numbers $W=w_i, \ldots, w_n$. In practice, each value $w_i$ may be chosen independently from a normal distribution $N(0,1)$, where $N(\mu, \sigma^2)$ with mean $\mu$ and variance $\sigma^2$ or of a uniform distribution from $\{1,-1\}$ or $\{0,1\}$.

It is highly unlikely that the extracted mark W* will be identical to the original watermark W. Even the act of requantizing the watermarked document for transmission will cause W* to deviate from W. A preferred measure of the similarity of W and W* is $$\text{sim}(W, W^*) = \frac{W^* \cdot W}{\sqrt{W^* \cdot W^*}} \quad (4)$$

Large values of sim (W,W*) are significant in view of the following analysis. Assume that the authors of document D* had no access to W (either through the seller or through a watermarked document). Then for whatever value of W* is obtained, the conditional distribution on $w_i$ will be independently distributed according to $N(0,1)$. In this case, $$N\left(0, \sum_{i=1}^{n} x_i^{*2}\right) = N(0, W^* \cdot W^*).$$

Thus, sim(W,W*) is distributed according to $N(0,1)$. Then, one may apply the standard significance tests for the normal distribution. For example, if D* is chosen independently from W, then it is very unlikely that sim(W,W*)>5. Note that somewhat higher values of sim(W,W*) may be needed when a large number of watermarks are on file. The above analysis required only the independence of W from W*, and did not rely on any specific properties of W* itself. This fact provides further flexibility when preprocessing W*.

The extracted watermark W* may be extracted in several ways to potentially enhance the ability to extract a watermark. For example, experiments on images encountered instances where the average value of W*, denoted $E_i(W^*)$, differed substantially from 0, due to the effects of a dithering procedure. While this artifact could be easily eliminated as part of the extraction process, it provides a motivation for postprocessing extracted watermarks. As a result, it was discovered that the simple transformation $w_i^* \leftarrow w_i^* - E_i(W^*)$ yielded superior values of sim (W,W*). The improved performance resulted from the decreased value of W*·W*; the value of W*·W was only slightly affected.

In experiments it was frequently observed that $w_i^*$ could be greatly distorted for some values of i. One postprocessing option is to simply ignore such values, setting them to 0. That is, $$w_i^* \leftarrow \begin{cases} w_i^* & \text{if } |w_i^*| > \text{tolerance} \\ 0 & \text{otherwise} \end{cases}$$

The goal of such a transformation is to lower W*·W*. A less abrupt version of this approach is to normalize the W* values to be either −1,0 or 1, by $$w_i^* \leftarrow \text{sign}(w_i^* - E_i(W^*)).$$

This transformation can have a dramatic effect on the statistical significance of the result. Other robust statistical techniques could also be used to suppress outlier effects.

In principle, any frequency domain transform can be used. In the scheme described below, a Fourier domain method is used, but the use of wavelet based schemes are also useable as a variation. In terms of selecting frequency regions of the transform, it is possible to use models for the perceptual system under consideration.

Frequency analysis may be performed by a wavelet or sub-band transform where the signal is divided into sub-bands by means of a wavelet or multi-resolution transform. The sub-bands need not be uniformly spaced. Each sub-band may be thought of as representing a frequency region in the domain corresponding to a sub-region of the frequency range of the signal. The watermark is then inserted into the sub-regions.

For audio data, a sliding "window" moves along the signal data and the frequency transform (DCT, FFT, etc.) is taken of the sample in the window. This process enables the capture of meaningful information of a signal that is time varying in nature.

Each coefficient in the frequency domain is assumed to have a perceptual capacity. That is, it can support the insertion of additional information without any (or with minimal) impact to the perceptual fidelity of the data.

In order to place a length L watermark into an N×N image, the N×N FFF (or DCT) of the image is computed and the watermark is placed into the L highest magnitude coefficients of the transform matrix, excluding the DC component. More generally, L randomly chosen coefficients could be chosen from the M, M≧L most perceptually significant coefficients of the transform. For most images, these coefficients will be the ones corresponding to the low frequencies. The purpose of placing the watermark in these locations is because significant tampering with these frequencies will destroy the image fidelity or perceived quality well before the watermark is destroyed.

The FFT provides perceptually similar results to the DCT. This is different than the case of transform coding, where the DCT is preferred to the FFT due to its spectral properties. The DCT tends to have less high frequency information than that the FFT, and places most of the image information in the low frequency regions, making it preferable in situations where data need to be eliminated. In the case of watermarking, image data is preserved, and nothing is eliminated. Thus the FFT is as good as the DCT, and is preferred since it is easier to compute.

Figure 4:
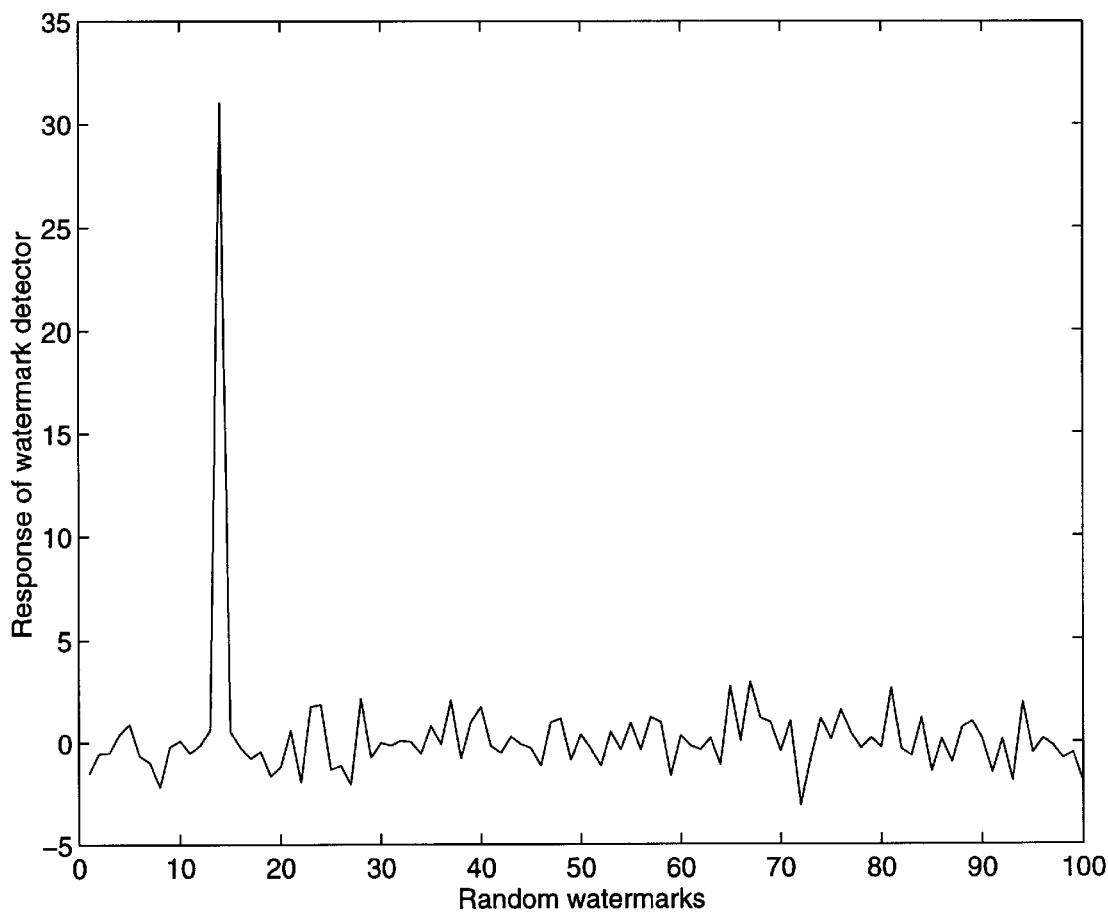
FIG. 4 is a graph of the responses of the watermark detector to random watermarks.

In an experiment, a visually imperceptible watermark was intentionally placed in an image. Subsequently, 100 randomly generated watermarks, only one of which corresponded to the correct watermark, were applied to the watermark detector described above. The result, as shown in FIG. 4, was a very strong positive response corresponding to the correct watermark, suggesting that the method results in a very low number of false positive responses and a very low false negative response rate.

In another test, the watermarked image was scaled to half of its original size. In order to recover the watermark, the image was re-scaled to its original size, albeit with loss of detail due to subsampling of the image using low pass spatial filter operations. The response of the watermark detector was well above random chance levels, suggesting that the watermark is robust to geometric distortions. This result was achieved even though 75 percent of the original data was missing from the scaled down image.

In a further experiment, a JPEG encoded version of the image with parameters of 10 percent quality and 0 percent smoothing, resulting in visible distortions, was used. The results of the watermark detector suggest that the method is robust to common encoding distortions. Even using a version of the image with parameters of the 5 percent quality and 0 percent smoothing, the results were well above that achievable due to random chance.

In experiments using a dithered version of the image, the response of the watermark detector suggested that the method is robust to common encoding distortion. Moreover, more reliable detection is achieved by removing any non-zero mean from the extracted watermark.

In another experiment, the image was clipped, leaving only the central quarter of the image. In order to extract the watermark from the clipped image, the missing portion of the image was replaced with portions from the original unwatermarked image. The watermark detector was able to recover the watermark with a response greater than random. When the non-zero mean was removed, and the elements of the watermark were binarized prior to the comparison with the correct watermark, the detector response was improved. This result is achieved even though 75 percent of the data was removed from the image.

In yet another experiment, the image was printed, photocopied, scanned using a 300 dpi Umax PS-2400x scanner and rescaled to a size of 256×256 pixels. Clearly, the final image suffered from different levels of distortion introduced at each process. High frequency pattern noise was particularly noticeable. When the non-zero mean was removed and only the sign of the elements of the watermark was used, the watermark detector response improved to well above random chance levels.

Figure 5:
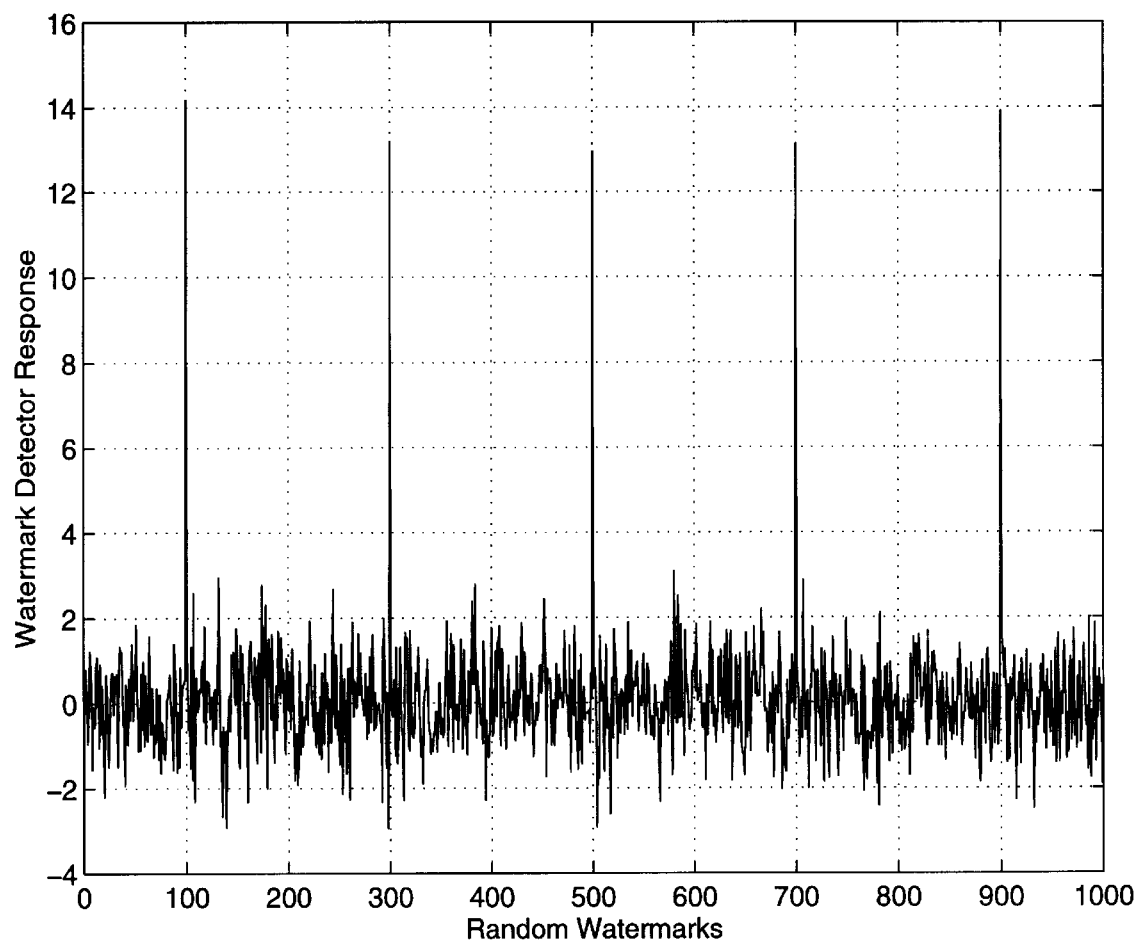
FIG. 5 is a graph of the response of the watermark detector to random watermarks for an image which is successively watermarked five times.

In still another experiment, the image was subject to five successive watermarking operations. That is, the original image was watermarked, the watermarked image was watermarked, and so forth. The process may be considered another form of attack in which it is clear that significant image degradation occurs if the process is repeated. FIG. 5 shows the response of the watermark detector to 1000 randomly generated watermarks, including the five watermarks present in the image. The five dominant spikes in the graph, indicative of the presence of the five watermarks, show that successive watermarking does not interfere with the process.

The fact that successive watermarking is possible means that the history or pedigree of a document is determinable if successive watermarking is added with each copy.

Figure 6:
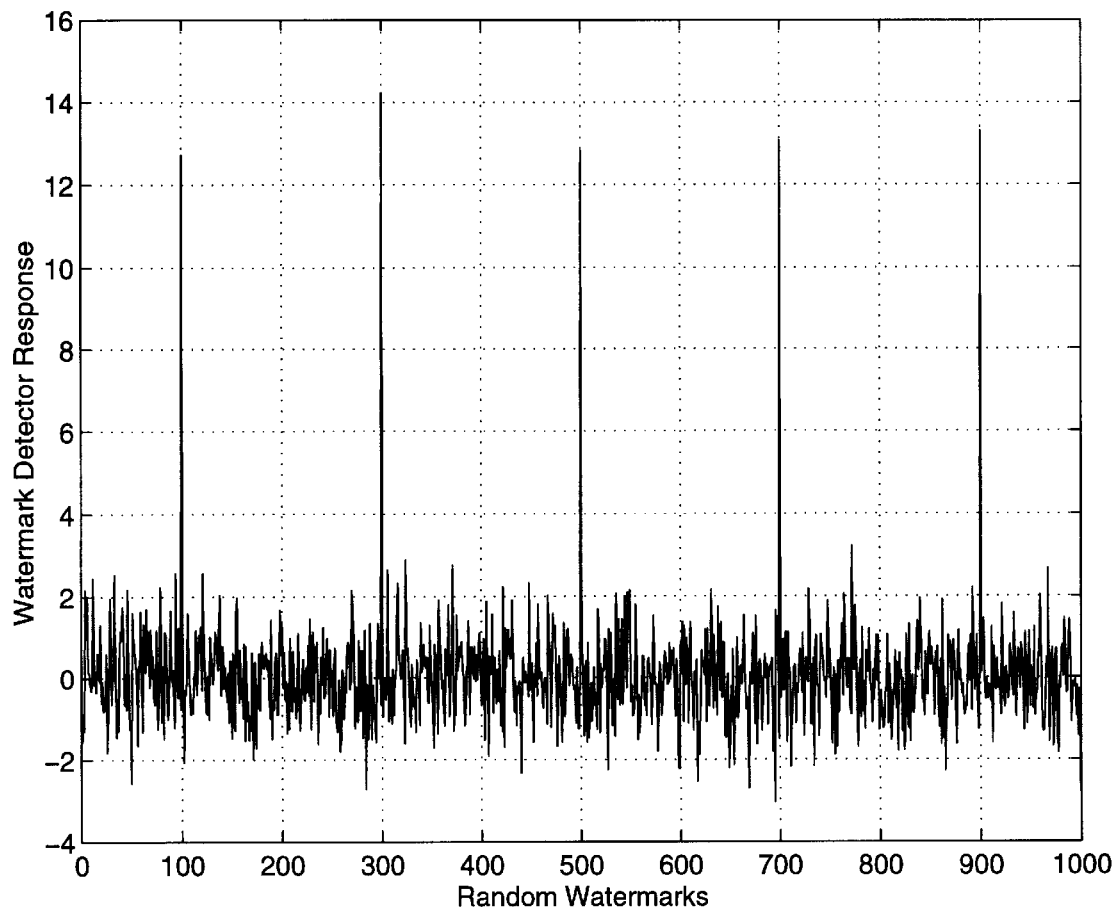
FIG. 6 is a graph of the response of the watermark detector to random watermarks where five images, each having a different watermark, and averaged together.

In a variation of the multiple watermark image, five separately watermarked images were averaged together to simulate simple conclusion attack. FIG. 6 shows the response of the watermark detector to 1000 randomly generated watermarks, including the five watermarks present in the original images. The result is that simple collusion based on averaging is ineffective in defeating the present watermarking system.

The result of the above experiments is that the described system can extract a reliable copy of the watermark from images that have been significantly degraded through several common geometric and signal processing procedures. These procedures include zooming (low pass filtering), cropping, lossy JPEG encoding, dithering, printing, photocopying and subsequent rescanning.

While these experiments were, in fact, conducted using an image, similar results are attainable with text images, audio data and video data, although attention must be paid to the time varying nature of these data.

The above implementation of the watermarking system is an electronic system. Since the basic principle of the invention is the inclusion of a watermark into spectral frequency components of the data, watermarking can be accomplished by other means using, for example, an optical system as shown in FIG. 7.

Figure 7:
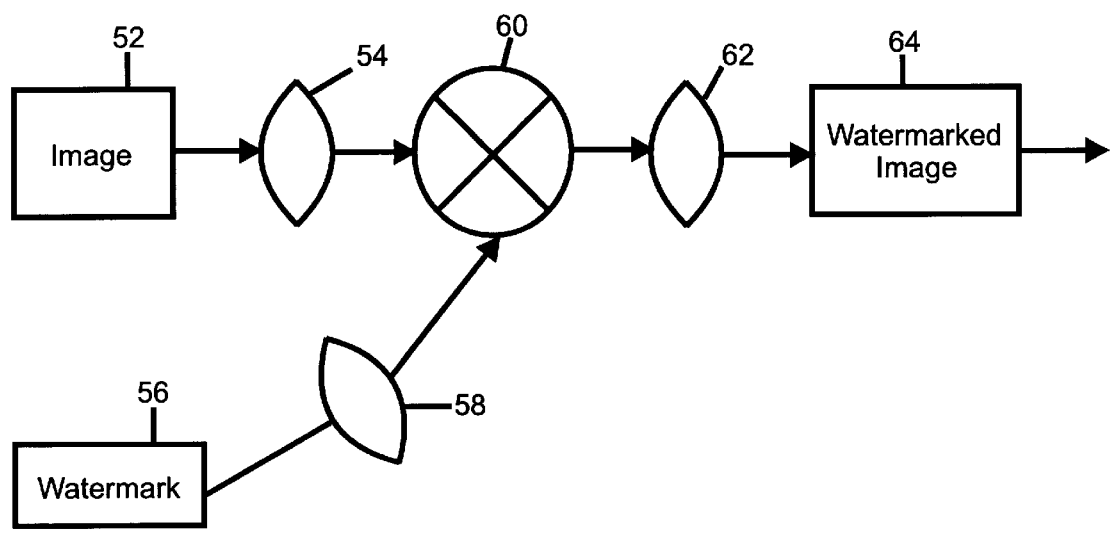
FIG. 7 is a schematic diagram of an optical embodiment of the present invention

In FIG. 7, data to be watermarked such as an image 52 is passed through a spatial transform lens 54, such as a Fourier transform lens, the output of which lens is the spatial transform of the image. Concurrently, a watermark image 56 is passed through a second spatial transform lens 58, the output of which lens is the spatial transfer of the watermark image 56. The spatial transform from lens 54 and the spatial transform from lens 58 are combined at an optical combiner 60. The output of the optical combiner 60 is passed through an inverse spatial transform lens 62 from which the watermark image 64 is present. The result is a unique, virtually imperceptible, watermarked image. Similar results are achievable by transmitting video or multimedia signals through the lenses in the manner described above.

While there have been described and illustrated spread spectrum watermarking of data and variations and modifications thereof, it will be apparent to those skilled in the art that further variations and modifications are possible without deviating from the broad principles and spirit of the present invention which shall be limited solely by the scope of the claims appended hereto.

What is claimed is:

1. A method of inserting a watermark into data comprising the steps of:

obtaining a decomposition of data to be watermarked where said data to be watermarked is a representation of humanly perceivable material;

modifying the data to be watermarked by subjecting the data to at least one of distortion and tampering;

obtaining a decomposition of the modified data;

comparing the components of the decomposition of data to be watermarked with the components of the decomposition of the modified data; and inserting a watermark into the data to be watermarked based upon said comparing.

2. A method of inserting a watermark into data as set forth in claim 1, where said inserting a watermark sequentially inserts a plurality of watermarks into perceptually significant components of the decomposition of data.

3. A method for extracting a watermark from data containing a watermark comprising the steps of:

obtaining a decomposition of data containing a watermark;

providing a decomposition of data to be watermarked which data to be watermarked is a representation of humanly perceivable material;

extracting a possible watermark as the difference between said decomposition of data containing a watermark and said decomposition of data to be watermarked at predetermined perceptually significant components of the decomposition of data to be watermarked; and analyzing said extracted possible watermark to determine the presence of said watermark in said data containing a watermark.

4. A method extracting a watermark from data containing a watermark as set forth in claim 3, where said analyzing comprises measuring the similarity of the watermark (W) with the extracted possible watermark (W*).

5. A method of extracting a watermark from data containing a watermark as set forth in claim 4, where said similarity is measured according to the equation $$\mathrm{sim}(W, W^*) = \frac{W^* \cdot W}{\sqrt{W^* \cdot W^*}}.$$

6. A method of inserting a watermark into data comprising the steps of:

provide a medium containing data;

obtaining a decomposition of the data to be watermarked;

modifying the data to be watermarked by subjecting the data to at least one of distortion and tampering;

obtaining a decomposition of the modified data;

comparing the components of the decomposition of data to be watermarked with the components of the decomposition of the modified data; and inserting a watermark into the data to be watermarked based upon said comparing.

7. A method of inserting a watermark into data as set forth in claim 6, where said inserting a watermark sequentially inserts a plurality of watermarks into perceptually significant components of the decomposition of data.

8. A method for extracting a watermark from data containing a watermark comprising the steps of:

providing medium containing data including a watermark and data to be watermarked;

obtaining a decomposition of data including a watermark;

providing a decomposition of data to be watermarked;

extracting a possible watermark as the difference between said decomposition of data including a watermark and said decomposition of data to be watermarked at predetermined perceptually significant components of the decomposition of data to be watermarked; and analyzing said extracted possible watermark to determine the presence of said watermark in said data containing a watermark.

9. A method of extracting a watermark from data containing a watermark as set forth in claim 8, where said analyzing comprises measuring the similarity of the watermark (W) with the extracted possible watermark (W*).

10. A method of extracting a watermark from data containing a watermark as set forth in claim 9, where said similarity is measured according to the equation $$\mathrm{sim}(W, W^*) = \frac{W^* \cdot W}{\sqrt{W^* \cdot W^*}}.$$

* * * * *